(12) United States Patent
Liang

(10) Patent No.: US 10,594,449 B2
(45) Date of Patent: Mar. 17, 2020

(54) VOICE DATA TRANSMISSION METHOD AND DEVICE

(71) Applicant: TENCENT TECHNOLOGY (SHENZHEN) COMPANY LIMITED, Shenzhen, Guangdong (CN)

(72) Inventor: Junbin Liang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 16 days.

(21) Appl. No.: 15/984,569

(22) Filed: May 21, 2018

(65) Prior Publication Data
US 2018/0278372 A1    Sep. 27, 2018

Related U.S. Application Data

(63) Continuation of application No. PCT/CN2017/085457, filed on May 23, 2017.

(30) Foreign Application Priority Data

May 25, 2016   (CN) .......................... 2016 1 0356121

(51) Int. Cl.
*H04L 1/18*    (2006.01)
*H04L 29/06*   (2006.01)

(52) U.S. Cl.
CPC ............ *H04L 1/189* (2013.01); *H04L 1/1883* (2013.01); *H04L 1/1887* (2013.01);
(Continued)

(58) Field of Classification Search
CPC ...... H04L 1/1883; H04L 1/189; H04L 1/1887
See application file for complete search history.

(56) References Cited

U.S. PATENT DOCUMENTS

| 6,438,513 B1 * | 8/2002 | Pastor ................. G10L 21/0208 702/191 |
| 2006/0077919 A1 * | 4/2006 | Gerkis .................. H04L 1/0007 370/315 |

(Continued)

FOREIGN PATENT DOCUMENTS

| CN | 101098173 A | 1/2008 |
| CN | 102137438 A | 7/2011 |

(Continued)

OTHER PUBLICATIONS

International Search Report of PCT/CN2017/085457 dated Jun. 28, 2017.

(Continued)

*Primary Examiner* — Hassan Kizou
*Assistant Examiner* — Deepa Belur
(74) *Attorney, Agent, or Firm* — Sughrue Mion, PLLC

(57) ABSTRACT

A voice data transmission method performed by at least one processor, includes placing multiple voice data frames in a target sending queue, sequentially sending the multiple voice data frames to a data receiving party, and identifying one or more important voice frames among the multiple voice data frames placed in the target sending queue. The method further includes placing the one or more important voice frames that are identified, in a retransmission processing queue, and for the multiple voice data frames that are sent, performing retransmission processing on only the one or more important voice frames placed in the retransmission processing queue.

19 Claims, 14 Drawing Sheets

(52) U.S. Cl.
CPC ...... *H04L 29/06176* (2013.01); *H04L 1/1874* (2013.01); *H04L 69/164* (2013.01)

(56) References Cited

U.S. PATENT DOCUMENTS

| | | | | |
|---|---|---|---|---|
| 2008/0027717 | A1* | 1/2008 | Rajendran | G10L 19/24 704/210 |
| 2012/0300663 | A1* | 11/2012 | Lu | H04L 1/1671 370/252 |
| 2016/0379662 | A1* | 12/2016 | Chen | G10L 21/0232 704/233 |
| 2017/0245178 | A1* | 8/2017 | Nobukiyo | H04W 28/14 |
| 2018/0184453 | A1* | 6/2018 | Viger | H04W 74/085 |
| 2018/0317156 | A1* | 11/2018 | Bergstrom | H04W 40/34 |

FOREIGN PATENT DOCUMENTS

| | | |
|---|---|---|
| CN | 103259803 A | 8/2013 |
| CN | 103490972 A | 1/2014 |
| CN | 104506287 A | 4/2015 |
| CN | 106067847 A | 11/2016 |
| WO | 2015/101402 A1 | 7/2015 |

OTHER PUBLICATIONS

Communication dated Apr. 3, 2019 from the State Intellectual Property Office of the P.R.C. in counterpart Application No. 201610356121.9.

\* cited by examiner

VOICE DATA TRANSMISSION METHOD AND DEVICE

CROSS-REFERENCE TO RELATED APPLICATIONS

This application claims is a continuation of International Patent Application No. PCT/CN2017/085457, filed on May 23, 2017, which claims priority from Chinese Patent Application No. 201610356121.9, entitled "VOICE DATA TRANSMISSION METHOD AND APPARATUS" and filed in the Chinese Patent Office on May 25, 2016, which are incorporated herein by reference in their entireties.

BACKGROUND

1. Field

Methods and apparatuses consistent with embodiments relate to the field of computer communication, and in particular, to a voice data transmission method and a voice data transmission apparatus.

2. Description of Related Art

Voice over IP (Voice over Internet Protocol, VoIP) is a real-time voice call system based on Ethernet. VoIP call quality of two parties depends on network quality and network transmission capabilities. To ensure data transmission of a real-time call, User Datagram Protocol (UDP) is usually used in VoIP. UDP is a connectionless transport layer protocol in the Open System Interconnection (OSI) reference model, and provides a transaction-oriented, simple, unreliable information transport service. IETF RFC 768 is a formal specification of UDP.

SUMMARY

According to embodiments, there is provided a voice data transmission method performed by at least one processor, the method including placing multiple voice data frames in a target sending queue, sequentially sending the multiple voice data frames to a data receiving party, and identifying one or more important voice frames among the multiple voice data frames placed in the target sending queue. The method further includes placing the one or more important voice frames that are identified, in a retransmission processing queue, and for the multiple voice data frames that are sent, performing retransmission processing on only the one or more important voice frames placed in the retransmission processing queue.

According to embodiments, there is provided a voice data transmission apparatus, including at least one memory configured to store computer program code, and at least one processor configured to access the at least one memory and operate according to the computer program code. The computer program code includes placing and sending code configured to cause the at least one processor to place multiple voice data frames in a target sending queue, and sequentially send the multiple voice data frames to a data receiving party, and identifying and placing code configured to cause the at least one processor to identify one or more important voice frames among the multiple voice data frames placed in the target sending queue, and place the one or more important voice frames that are identified, in a retransmission processing queue. The computer program code further includes retransmission code configured to cause the at least one processor to, for the multiple voice data frames that are sent, perform retransmission processing on only the one or more important voice frames placed in the retransmission processing queue.

A non-transitory computer-readable storage medium storing instructions that cause a processor of a voice data transmission apparatus to place multiple voice data frames in a target sending queue, sequentially send the multiple voice data frames to a data receiving party, and identify one or more important voice frames among the multiple voice data frames placed in the target sending queue. The instructions further cause the processor to place the one or more important voice frames that are identified, in a retransmission processing queue; and for the multiple voice data frames that are sent, perform retransmission processing on only the one or more important voice frames placed in the retransmission processing queue.

BRIEF DESCRIPTION OF THE DRAWINGS

To describe technical solutions of embodiments or existing technology more clearly, the following briefly introduces the accompanying drawings for describing the embodiments. Apparently, the accompanying drawings in the following description show only some embodiments, and a person of ordinary skill in the art may still derive other drawings from these accompanying drawings without creative efforts.

DETAILED DESCRIPTION OF EMBODIMENTS

The following clearly and completely describes technical solutions in embodiments of this application with reference to the accompanying drawings in the embodiments of this application. Apparently, the described embodiments are some but not all of the embodiments. All other embodiments obtained by persons skilled in the art based on the embodiments of the present application without creative efforts shall fall within the protection scope of the present application.

In some embodiments, when data transmission of a VoIP real-time call is performed by using UDP, packet loss often occurs when a network status is undesirable. Main methods for resolving this problem include a forward error correction technology and a retransmission technology.

Retransmission is a technical means in which when detecting that a target data packet is not received when a time expires or discovering that a target receiving packet becomes erroneous, a data receiving party sends a request packet to a data sending party, to request the data sending party to retransmit the erroneous data packet. In some embodiments, retransmission mainly includes the following several manners:

a. Stop and wait retransmission manner: After completing sending a data packet, a data sending party waits for a status report of a data receiving party, and if a status report packet indicates that the data packet is successfully sent, the data sending party sends a subsequent data packet. If a status report packet indicates that the data packet is unsuccessfully sent, the data sending party retransmits the packet.

b. Retransmission manner of retransmitting N previous frames: After a status packet sent by a data receiving party and received by a data sending party indicates that a packet is erroneous, the sending party retransmits N previous packets.

c. Selective retransmission manner: After a status packet sent by a data receiving party and received by a data sending party indicates that a packet is erroneous, the data sending party needs to send only the erroneous packet.

In the foregoing retransmission mechanism, a receiving status of each data packet needs to be determined, that is, an acknowledge packet needs to be sent and received. This operation needs to occupy a relatively large quantity of network bandwidth resources. If the data receiving party still unsuccessfully receives a correct data packet after retransmission is performed for the first time, the data sending party needs to continue to retransmit the data packet until the data packet is successfully received. When a network capability is relatively weak, this process may be performed for each data packet. This undoubtedly puts more pressure on network bandwidths, and does not help data transmission.

To resolve the foregoing technical problem, this application provides a voice data transmission method. The method is applied to a system architecture shown in FIG. 1.

Figure 1:
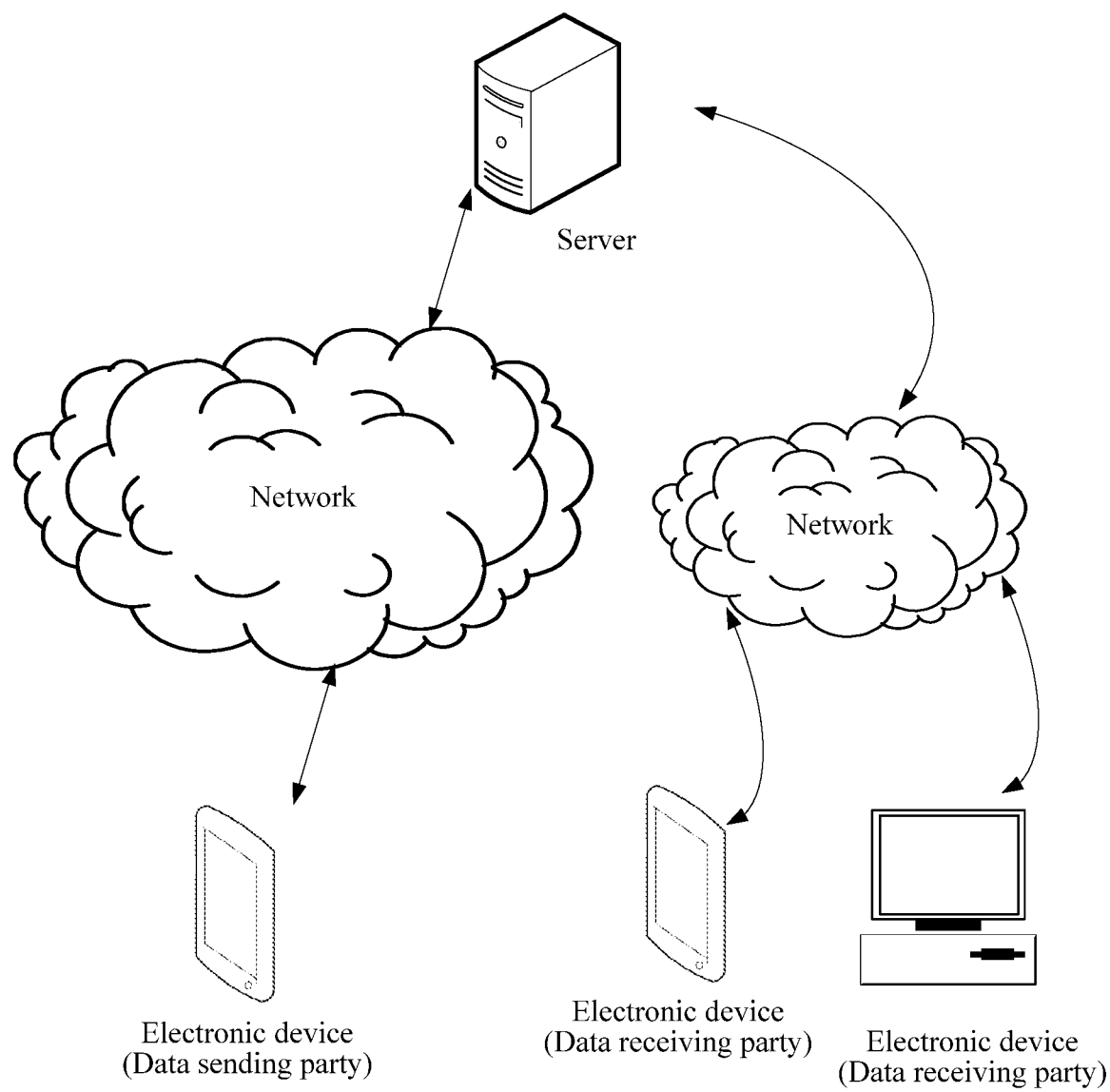
FIG. 1 is an architectural diagram of a scenario of a voice data transmission method according to an embodiment of this application.

FIG. 1 is an architectural diagram of a scenario of a voice data transmission method according to an embodiment of this application. Electronic devices may establish a voice connection and perform voice communication by using a network server. Therefore, a data sending party may send a collected voice data frame to a data receiving party in real time. When the data receiving party receives the voice data frame and determines that there is no error, the data receiving party may return an acknowledgement message indicating successful sending to the data sending party. Otherwise, the data receiving party may return an acknowledgement message indicating failed sending to the data sending party, and the data sending party may retransmit the lost voice data frame to the data receiving party by using a data retransmission mechanism, to ensure call quality of the two parties.

Figure 2:
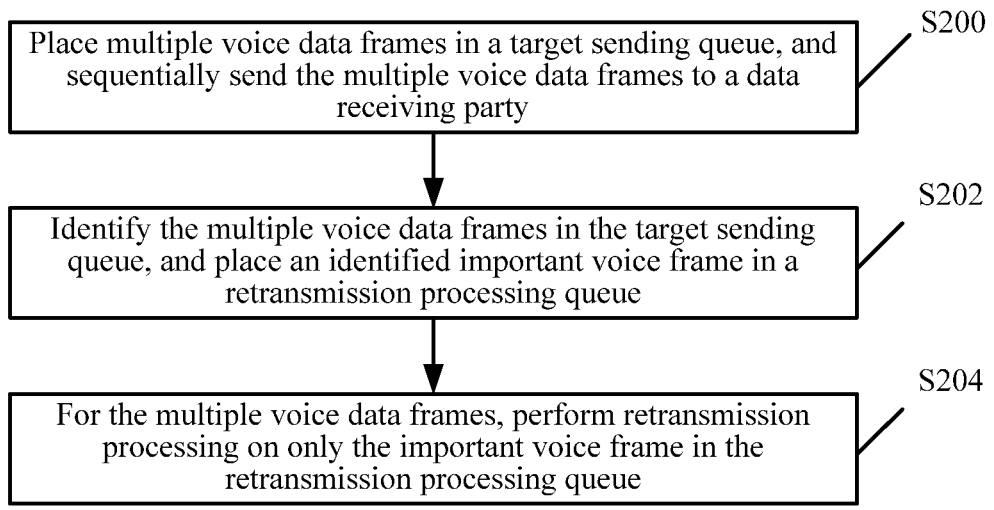
FIG. 2 is a schematic flowchart of a voice data transmission method according to an embodiment of this application.

FIG. 2 is a schematic flowchart of a voice data transmission method according to an embodiment of this application. The following describes, in detail with reference to FIG. 2, the technical solution of the voice data transmission method provided in the embodiments. The method includes the following steps.

Step S200: Place multiple voice data frames in a target sending queue, and sequentially send the multiple voice data frames to a data receiving party.

The data sending party and the data receiving party establish a voice communication connection. The data sending party may encode collected voice information to generate the multiple voice data frames, place the multiple voice data frames in the target sending queue, and sequentially send the voice data frames to the data receiving party.

Step S202: Identify the multiple voice data frames in the target sending queue, and place an identified important voice frame in a retransmission processing queue.

In the embodiments of this application, the voice data frames may be classified into an important voice frame and an unimportant voice frame by using a specified condition. For example, a frame meeting a preset condition is the important voice frame or the unimportant voice frame. The multiple voice data frames may be identified according to the preset condition. For example, it may be set that a data frame including no voice content information or a frame that can be desirably restored easily by using a packet loss compensation means is the unimportant voice frame (a frame other than the unimportant voice frame is the important voice frame). The data frame including no voice content information may include a non-voice frame, a noise frame with extremely low energy, or the like. After the important voice frame is identified from the multiple voice data frames, the important voice frame is placed in the preset retransmission processing queue.

In the embodiments of this application, the target sending queue and the retransmission processing queue may be two different queues. The target sending queue is used to normally send the voice data frame to be sent, and the retransmission processing queue is used to perform retransmission processing on the important voice frame. In the embodiments of this application, the target sending queue and the retransmission processing queue may alternatively be a same queue. That is, the important voice frame may be placed in the target sending queue. A time at which the important voice frame is sent again (that is, retransmitted) may be estimated, and the important voice frame is inserted to the target sending queue according to the time, to conveniently determine retransmission after packet loss occurs for the important voice frame.

Step S204: For the multiple voice data frames, perform retransmission processing on only the important voice frame in the retransmission processing queue.

In the embodiments of this application, for the sent multiple voice data frames, retransmission processing is performed only on the important voice frame in the retransmission processing queue, and retransmission processing is not performed on the unimportant voice frame of the multiple voice data frames other than the important voice frame. That is, regardless of whether the unimportant voice frame is successfully received by the data receiving party, the data sending party does not retransmit the unimportant voice frame.

In implementation of the embodiment of this application, it is not required that a receiving status of each voice data frame is determined to determine whether retransmission is needed. This effectively resolves a technical problem that when a network capability is relatively weak, data retransmission increases network bandwidth pressure and does not help avoid network packet loss. In the embodiments of this application, a retransmission policy is executed by defining the unimportant voice frame and determining whether the sent voice data frame is the unimportant voice frame. A non-voice frame, a noise frame with extremely low energy, or a frame that can be desirably restored by using a packet loss compensation means is not retransmitted. A relatively large part of frame retransmission can be avoided in a call process, thereby more effectively using network bandwidth resources.

Figure 3:
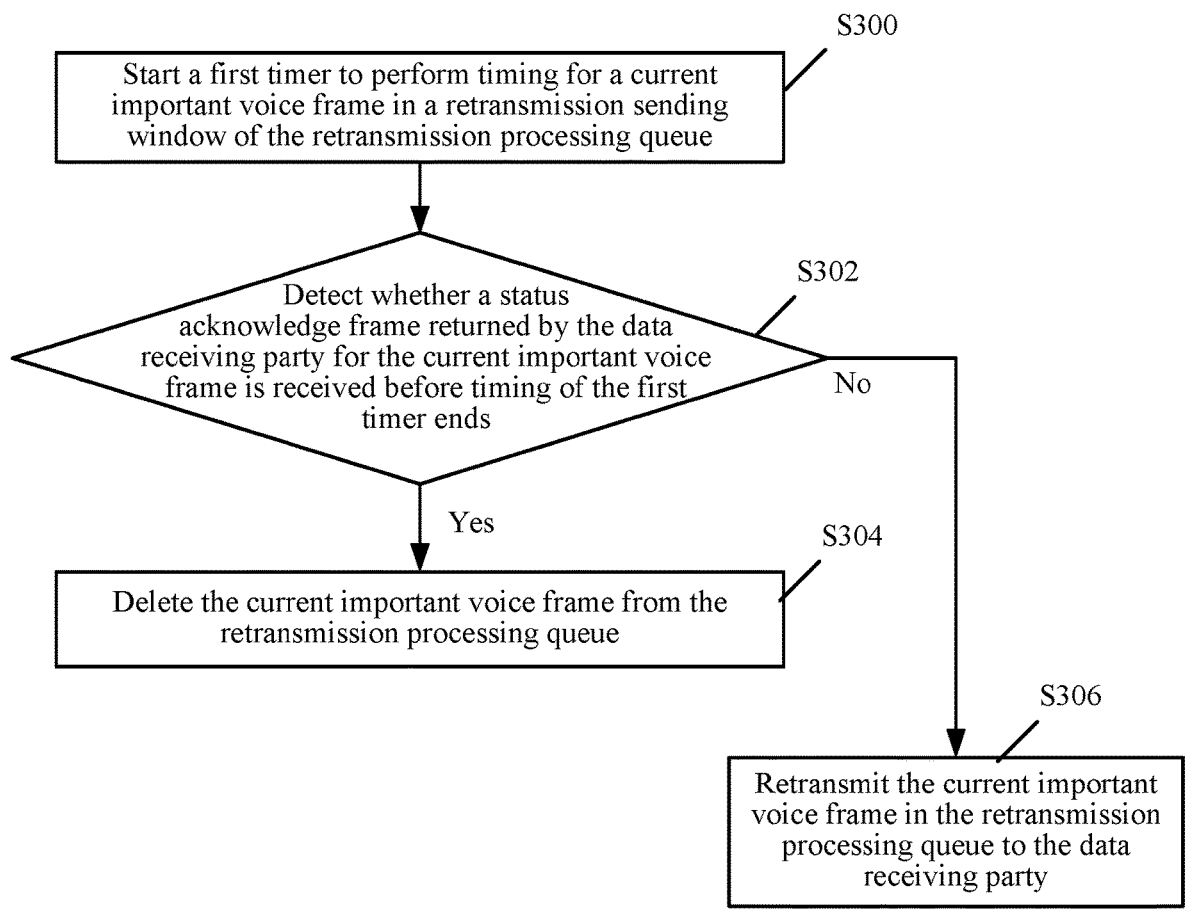
FIG. 3 is a schematic flowchart of a voice data transmission method according to another embodiment of this application.

FIG. 3 is a schematic flowchart of a voice data transmission method according to another embodiment of this application. The following describes how to perform retransmission processing on the important voice frame in the retransmission processing queue. The following steps are included.

Step S300: Start a first timer to perform timing for a current important voice frame in a retransmission sending window of the retransmission processing queue.

A timing start time of the first timer is a sending time point of the current important voice frame in the target sending queue. In the embodiments of this application, a timing length of the first timer is not limited, and a technical person may set the timing length of the first timer according to a requirement or experience thereof.

Step S302: Detect whether a status acknowledge frame returned by the data receiving party for the current important voice frame is received before timing of the first timer ends.

In the embodiments of this application, the status acknowledge frame indicates whether the current important voice frame is successfully received by the data receiving party. When a detection result is yes, perform step S304; otherwise, perform step S306.

Step S304: Delete the current important voice frame from the retransmission processing queue.

Step S306: Retransmit the current important voice frame in the retransmission processing queue to the data receiving party.

After step S306, return to perform step S300 again to determine again whether the current important voice frame needs to be retransmitted. Further, in the embodiments of this application, to avoid that the important voice frame is retransmitted for an unlimited quantity of times and avoid more pressure on network bandwidths, the following steps may be performed.

While starting the first timer for timing, a second timer is started for timing. A timing length of the second timer is greater than the timing length of the first timer. In this way, if the status acknowledge frame returned by the data receiving party for the current important voice frame is received before timing of the second timer ends or when timing of the second timer ends, the current important voice frame is deleted from the retransmission processing queue, to avoid that the important voice frame is retransmitted for an unlimited quantity of times and avoid more pressure on network bandwidths.

Alternatively, after the important voice frame in the retransmission processing queue is retransmitted to the data receiving party, the second timer is started for timing. In this case, a technical person may set the timing length of the second timer according to a requirement or experience thereof. When the status acknowledge frame returned by the data receiving party for the current important voice frame is received before timing of the second timer ends or when timing of the second timer ends, the current important voice frame is deleted from the retransmission processing queue, to avoid that the important voice frame is retransmitted for an unlimited quantity of times and avoid more pressure on network bandwidths.

The following describes how to determine whether the current voice data frame is the unimportant voice frame in detail with reference to FIG. 4 to FIG. 7 by using an example. It may be understood that a determined voice data frame of the multiple voice data frames other than the unimportant voice frame is an identified important voice frame.

Figure 4:
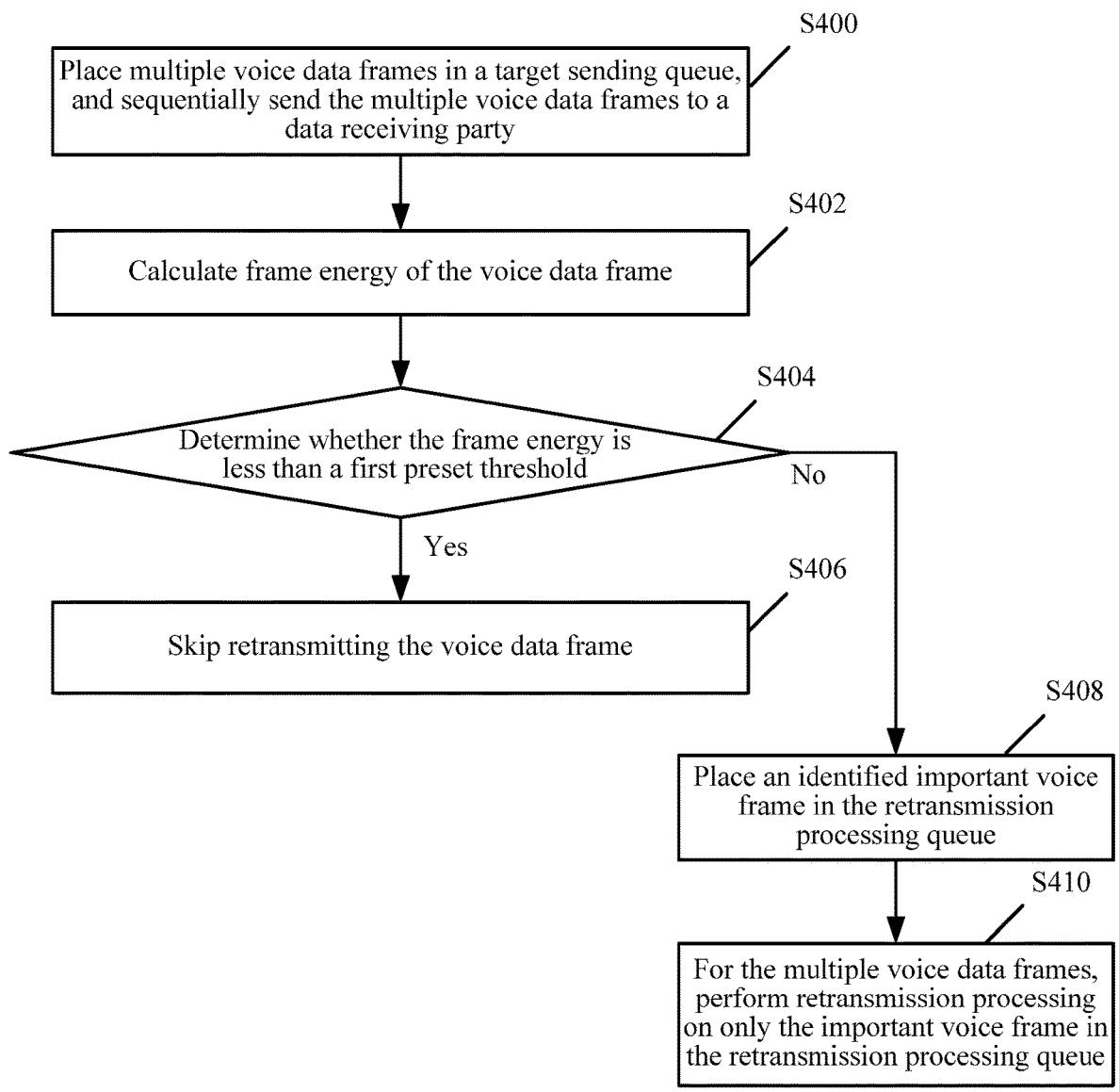
FIG. 4 is a schematic flowchart of a voice data transmission method according to another embodiment of this application.

FIG. 4 is a schematic flowchart of a voice data transmission method according to another embodiment of this application. The following steps may be included.

Step S400: Place multiple voice data frames in a target sending queue, and sequentially send the multiple voice data frames to a data receiving party.

Step S402: Calculate frame energy of the voice data frame.

The frame energy Engr of the voice data frame may be calculated by using the following formula:

$$Engr = \sum_{i=0}^{l-1} x(i) * x(i)$$

where l is a frame length.

Step S404: Determine whether the frame energy is less than a first preset threshold.

In the embodiments of this application, the first preset threshold is related to a value of l. As l is larger, a value of the first preset threshold may be larger. For example, when l is equal to 80, the first preset threshold may be set to $5*10^5$. When a determining result is yes, it is determined that the voice data frame is the unimportant voice frame, and perform step S406. Otherwise, it may be considered that the voice data frame is not the unimportant voice frame, and perform step S408.

In the embodiments of this application, the value of the first preset threshold is not limited, and a technical person may set the first preset threshold according to a requirement or experience thereof.

Step S406: Skip retransmitting the voice data frame.

Step S408: Place an identified important voice frame in the retransmission processing queue.

Step S410: For the multiple voice data frames, perform retransmission processing on only the important voice frame in the retransmission processing queue.

For step S408 and step S410, refer to description of step S202 and step S204 in the embodiment in FIG. 2, and details are not described herein again.

Figure 5:
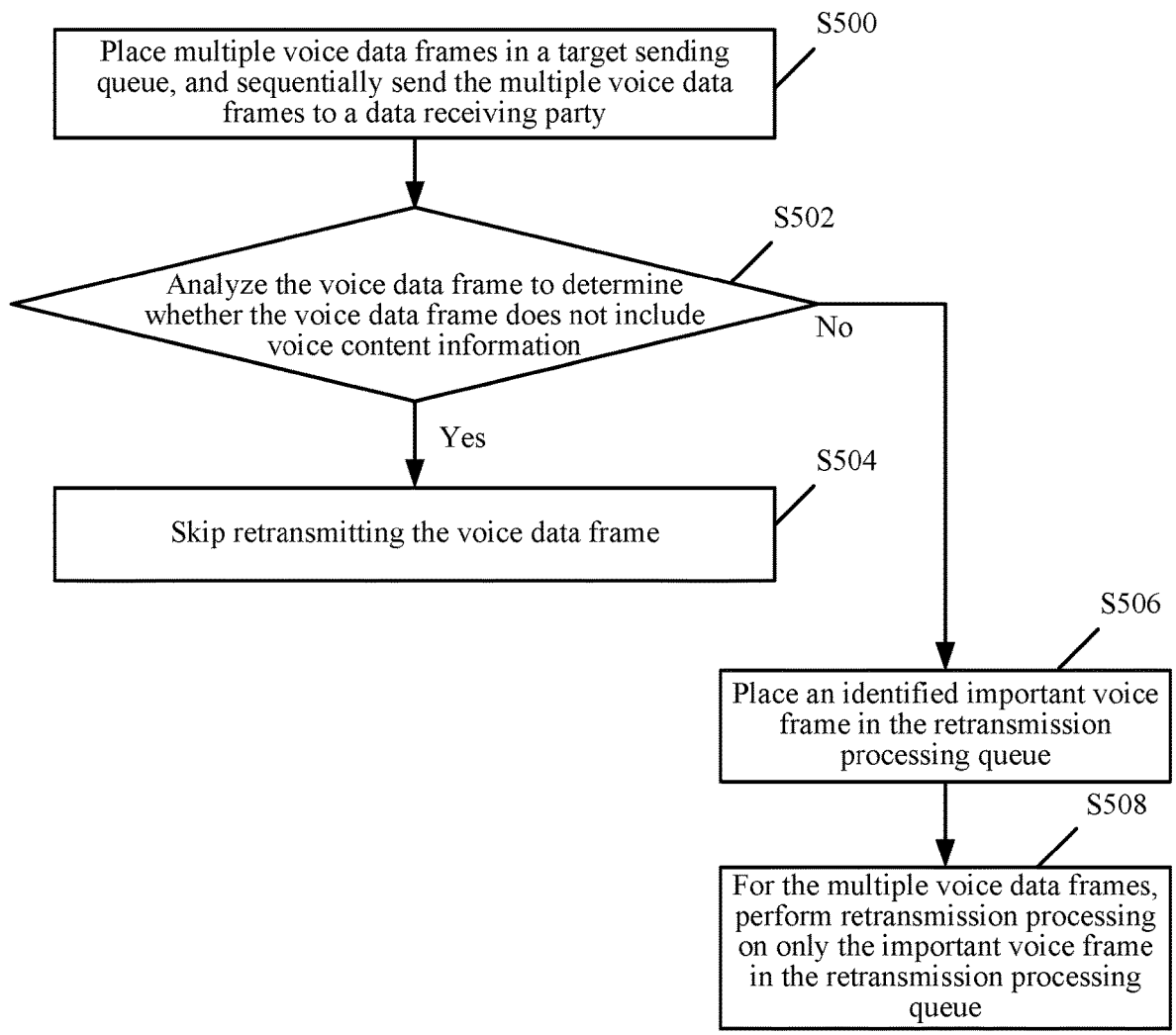
FIG. 5 is a schematic flowchart of a voice data transmission method according to another embodiment of this application.

FIG. 5 is a schematic flowchart of a voice data transmission method according to another embodiment of this application. The following steps may be included.

Step S500: Place multiple voice data frames in a target sending queue, and sequentially send the multiple voice data frames to a data receiving party.

Step S502: Analyze the voice data frame to determine whether the voice data frame does not include voice content information.

In the embodiments of this application, that the voice content information is not included may be understood as that the voice data frame completely does not include the voice content information or a volume of the voice content information included is less than a threshold. In the embodiments of this application, a manner of analyzing whether a current data frame does not include the voice content information is not limited. When an analysis result is yes, it is determined that the voice data frame is the unimportant voice frame, and perform step S504. Otherwise, it may be considered that the voice data frame is not the unimportant voice frame, and perform step S506.

Step S504: Skip retransmitting the voice data frame.

Step S506: Place an identified important voice frame in the retransmission processing queue.

Step S508: For the multiple voice data frames, perform retransmission processing on only the important voice frame in the retransmission processing queue.

For step S506 and step S508, refer to description of step S202 and step S204 in the embodiment in FIG. 2, and details are not described herein again.

Figure 6:
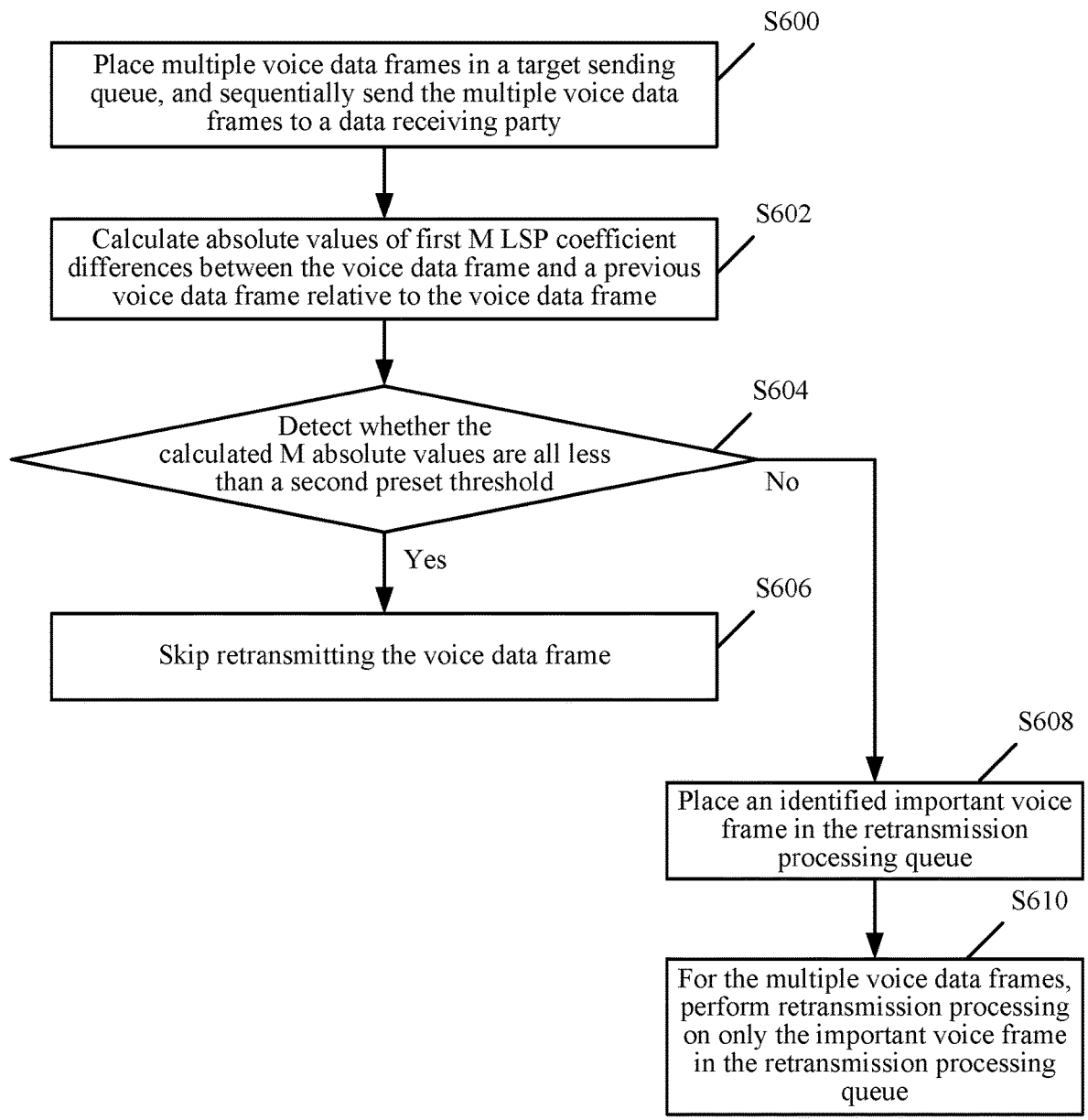
FIG. 6 is a schematic flowchart of a voice data transmission method according to another embodiment of this application.

FIG. 6 is a schematic flowchart of a voice data transmission method according to another embodiment of this application. The following steps may be included.

Step S600: Place multiple voice data frames in a target sending queue, and sequentially send the multiple voice data frames to a data receiving party.

Step S602: Calculate absolute values of first M linear spectrum pair (LSP) coefficient differences between the voice data frame and a previous voice data frame relative to the voice data frame.

Before the absolute values of the first M LSP coefficient differences between the voice data frame and a previous voice data frame relative to the voice data frame are calculated, an LSP coefficient of the voice data frame further needs to be calculated. For example, a Hamming window may be added to the voice data frame, a Yule-Walker equation is solved by means of Durbin recursion, to obtain a linear predictive coding (LPC) coefficient, and a complex conjugate root of a (p+1)th-order symmetric polynomial P(z) and a (p+1)th-order anti-symmetric polynomial Q(z) is solved according to the obtained pth-order LPC coefficient, to obtain the LSP coefficient A:

$$P(z)=A(z)+z-(p+1)\times A(z-1); \text{ and}$$

$$Q(z)=A(z)+z-(p+1)\times A(z-1).$$

After the LSP coefficient is obtained, in consideration that first three linear spectrum pairs affect voice to the greatest extent, 10 LSP coefficients may be calculated in voice encoding and decoding. In the embodiments of this application, M may be a positive integer such as 5, 6, or 7. For example, M is 6. That is, in the embodiments of this application, absolute values of first 6 LSP coefficient differences may be compared. A formula may be as follows:

$$lspdif(i)=abs(lspcur(i)-lsopre(i)); i=0-5.$$

Neighboring frame stability of first 6 LSP coefficients of the voice data frame and the previous voice data frame relative to the voice data frame may be used to determine whether a frame is the unimportant voice frame.

Step S604: Detect whether the calculated M absolute values are all less than a second preset threshold.

In the embodiments of this application, the second preset threshold may be 0.005. When a detection result is yes, it is detected that the voice data frame is the unimportant voice frame, and perform step S606. Otherwise, it may be considered that the voice data frame is not the unimportant voice frame, and perform step S608.

In the embodiments of this application, the value of the second preset threshold is not limited, and a technical person may set the second preset threshold according to a requirement or experience thereof.

Step S606: Skip retransmitting the voice data frame.

Step S608: Place an identified important voice frame in the retransmission processing queue.

Step S610: For the multiple voice data frames, perform retransmission processing on only the important voice frame in the retransmission processing queue.

For step S608 and step S610, refer to description of step S202 and step S204 in the embodiment in FIG. 2, and details are not described herein again.

The embodiments in FIG. 4, FIG. 5, and FIG. 6 may be randomly combined to implement data retransmission. An example is as follows:

1. FIG. 4 and FIG. 5 may be combined: After the voice data frame is sent to the data receiving party, the frame energy of the voice data frame may be first calculated, and if it is determined that the energy is less than the first preset threshold, it is determined that the voice data frame is the unimportant voice frame. If it is determined that the energy is not less than the first preset threshold, it is analyzed whether the data frame does not include the voice content information. When it is learned by analysis that the voice data frame does not include the voice content information, it is determined that the voice data frame is the unimportant voice frame; otherwise, it is determined that the voice data frame is not the unimportant voice frame.

2. Alternatively, FIG. 4 and FIG. 6 are combined: After the voice data frame is sent to the data receiving party, the frame energy of the voice data frame may be first calculated, and if it is determined that the energy is less than the first preset threshold, it is determined that the voice data frame is the unimportant voice frame. If it is determined that the energy is not less than the first preset threshold, absolute values of first M LSP coefficient differences between the voice data frame and the previous voice data frame relative to the voice data frame are further calculated, and it is detected whether the calculated M absolute values are all less than the second preset threshold. When it is detected that the calculated M absolute values are all less than the second preset threshold, it is determined that the voice data frame is the unimportant voice frame; otherwise, it is determined that the voice data frame is not the unimportant voice frame.

3. Alternatively, FIG. 5 and FIG. 6 are combined: After the voice data frame is sent to the data receiving party, it may be first analyzed whether the voice data frame does not include the voice content information, and when it is learned by analysis that the voice data frame does not include the voice content information, it is determined that the voice data frame is the unimportant voice frame. When it is learned by analysis that the voice data frame includes the voice content information, absolute values of first M LSP coefficient differences between the voice data frame and the previous voice data frame relative to the voice data frame are further calculated, and it is detected whether the calculated M absolute values are all less than the second preset threshold. When it is detected that the calculated M absolute values are all less than the second preset threshold, it is determined that the voice data frame is the unimportant voice frame; otherwise, it is determined that the voice data frame is not the unimportant voice frame.

4. Alternatively, FIG. 4, FIG. 5, and FIG. 6 are combined as described in FIG. 7.

Figure 7:
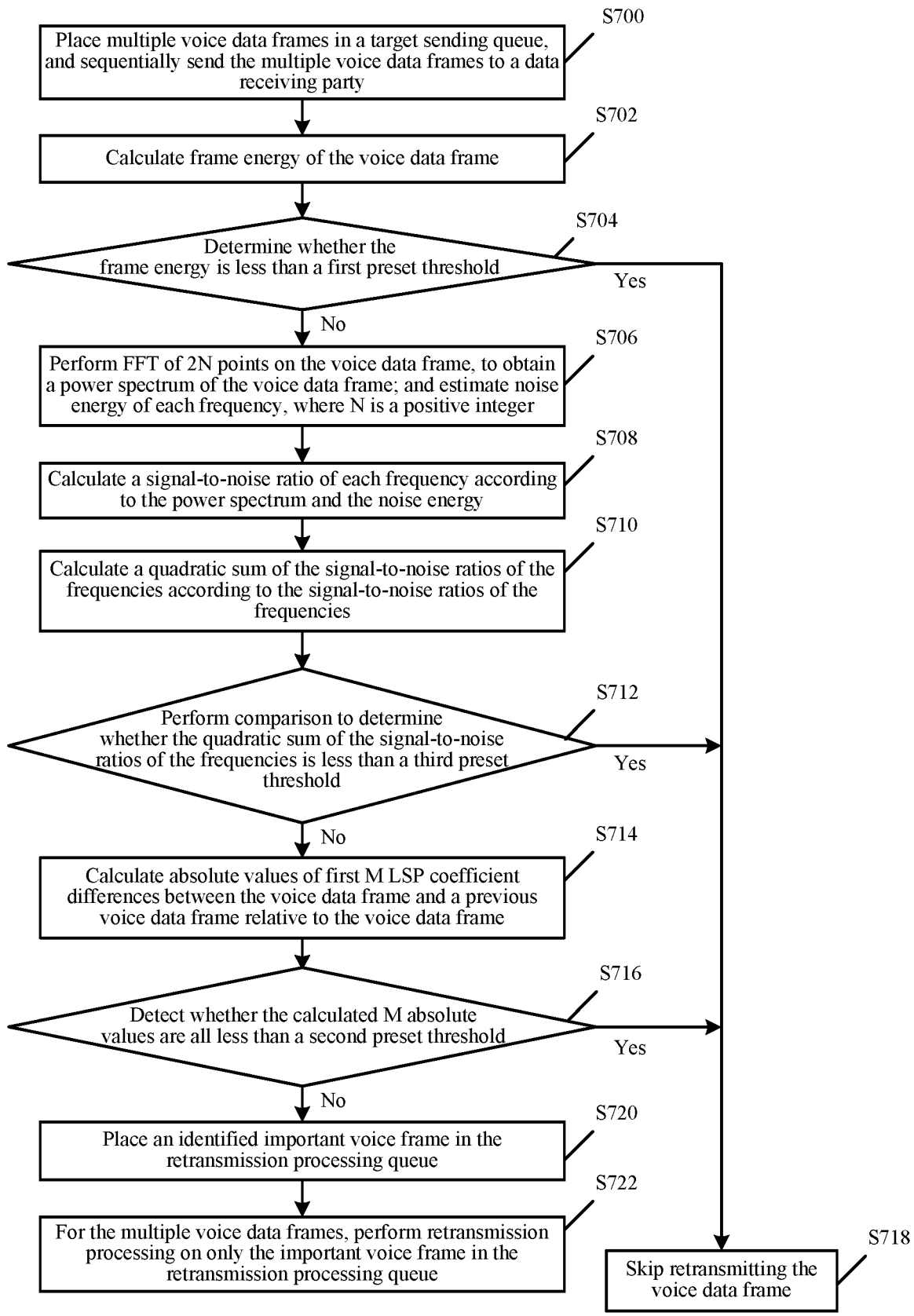
FIG. 7 is a schematic flowchart of a voice data transmission method according to another embodiment of this application.

FIG. 7 is a schematic flowchart of a voice data transmission method according to another embodiment of this application. The following steps may be included.

Step S700: Place multiple voice data frames in a target sending queue, and sequentially send the multiple voice data frames to a data receiving party.

Step S702: Calculate frame energy of the voice data frame.

Refer to step S402 in the embodiment in FIG. 4, and details are not described herein again.

Step S704: Determine whether the frame energy is less than a first preset threshold.

Refer to step S404 in the embodiment in FIG. 4. When a determining result is yes, perform step S718. Otherwise, perform step S706.

Step S706: Perform fast Fourier transformation (FFT) of 2N points on the voice data frame, to obtain a power spectrum of the voice data frame; and estimate noise energy of each frequency, where N is a positive integer.

Step S706 to step S712 are an implementation for analyzing whether the voice data frame does not include the voice content information. FFT of 2N points is performed on the voice data frame, to obtain the power spectrum level (j) of the voice data frame, where j=1–N. Noise energy noise(j) of each frequency may be estimated based on a minima controlled recursive averaging (MCRA) algorithm, where j=1–N.

Step S708: Calculate a signal-to-noise ratio of each frequency according to the power spectrum and the noise energy.

The signal-to-noise ratio of each frequency snr (j)=level (j)/noise(j), where j=1–N.

Step S710: Calculate a quadratic sum of the signal-to-noise ratios of the frequencies according to the signal-to-noise ratios of the frequencies.

The quadratic sum of the signal-to-noise ratios of the frequencies is $$\text{snr\_sum} = \sum_{j=1}^{N} snr(j) * snr(j).$$

Step S712: Perform comparison to determine whether the quadratic sum of the signal-to-noise ratios of the frequencies is less than a third preset threshold.

In the embodiments of this application, the third preset threshold is related to a value of N. For example, when N is equal to 64, the first preset threshold may be set to 2. When a comparison result is yes, perform step S718; otherwise, perform step S714.

In the embodiments of this application, the value of the third preset threshold is not limited, and a technical person may set the third preset threshold according to a requirement or experience thereof.

Step S714: Calculate absolute values of first M LSP coefficient differences between the voice data frame and a previous voice data frame relative to the voice data frame.

Refer to step S602 in the embodiment in FIG. 6, and details are not described herein again.

Step S716: Detect whether calculated M absolute values are all less than a second preset threshold.

Refer to step S604 in the embodiment in FIG. 6. When a detection result is yes, perform step S718. Otherwise, perform step S720.

Step S718: Skip retransmitting the voice data frame.

Step S720: Place an identified important voice frame in the retransmission processing queue.

Step S722: For the multiple voice data frames, perform retransmission processing on only the important voice frame in the retransmission processing queue.

For step S720 and step S722, refer to description of step S202 and step S204 in the embodiment in FIG. 2, and details are not described herein again.

In the embodiments of this application, the embodiments in FIG. 4, FIG. 5, and FIG. 6 may be randomly combined, and are not limited to the foregoing four combinations. There are other determining and combination manners. For example, an execution sequence of the combinations changes, and not all details are listed herein. Combination manners that may be implemented by a person skilled in the art according to descriptions in the embodiments of this application all belong to the protection scope of this application.

Further, when packet loss occurs for the unimportant voice frame sent by the data sending party to the data receiving party, the data receiving party may omit the unimportant voice frame or restore the unimportant voice frame by using a packet loss compensation means according to an actual case. For example, the unimportant voice frame is restored by using a previous frame closely correlated to the voice data frame or a frame whose pitch period is different from that of a previous frame to the very low extent.

In implementation of the embodiments, multiple voice data frames are placed in a target sending queue, and the multiple voice data frames are sequentially sent to a data receiving party. The multiple voice data frames in the target sending queue are identified, and an identified important voice frame is placed in a retransmission processing queue. For the multiple voice data frames, retransmission processing is performed on only the important voice frame in the retransmission processing queue. But retransmission processing is not performed on the unimportant voice frame. It is not required that a receiving status of each voice data frame is determined to determine whether retransmission is needed. This effectively resolves an existing-technology technical problem that when a network capability is relatively weak, data retransmission increases network bandwidth pressure and does not help data transmission. In the embodiment, a retransmission policy is executed by defining the unimportant voice frame and determining whether the sent voice data frame is the unimportant voice frame. A non-voice frame, a noise frame with extremely low energy, or a frame that can be desirably restored by using a packet loss compensation means is not retransmitted. A relatively large part of frame retransmission can be avoided in a call process, thereby more effectively using network bandwidth resources.

To better implement the foregoing solutions in the embodiments of this application, this application further correspondingly provides a voice data transmission apparatus.

Figure 8:
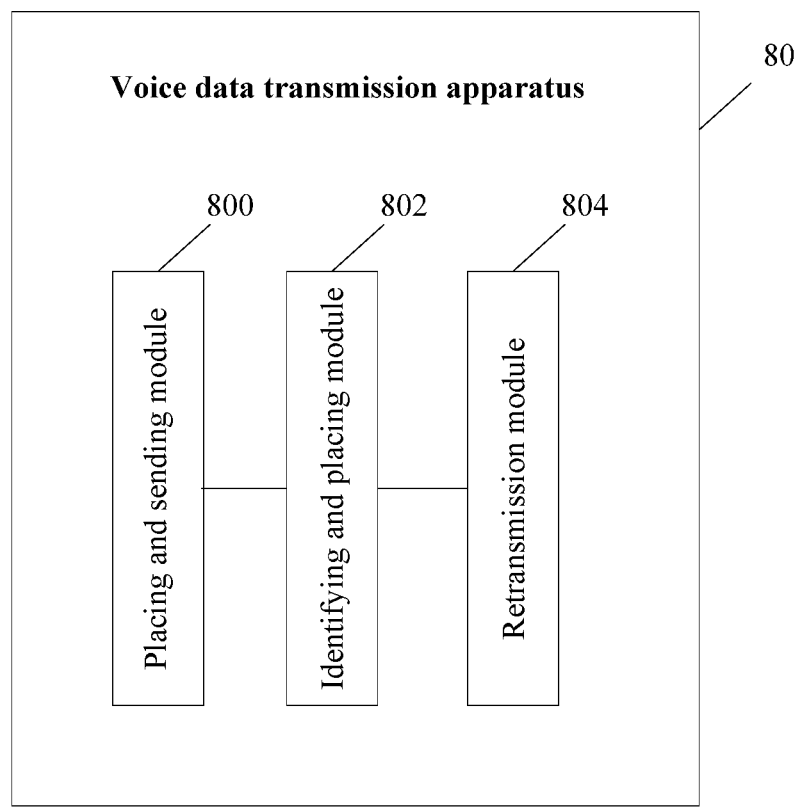
FIG. 8 is a schematic structural diagram of a voice data transmission apparatus according to an embodiment of this application.

FIG. 8 is a schematic structural diagram of a voice data transmission apparatus according to an embodiment of this application. The voice data transmission apparatus 80 may include: a placing and sending module 800, an identifying and placing module 802, and a retransmission module 804.

The placing and sending module 800 is configured to: place multiple voice data frames in a target sending queue, and sequentially send the multiple voice data frames to a data receiving party.

The identifying and placing module 802 is configured to: identify the multiple voice data frames in the target sending queue, and place an identified important voice frame in a retransmission processing queue.

The retransmission module 804 is configured to: for the multiple voice data frames, perform retransmission processing on only the important voice frame in the retransmission processing queue.

Figure 9:
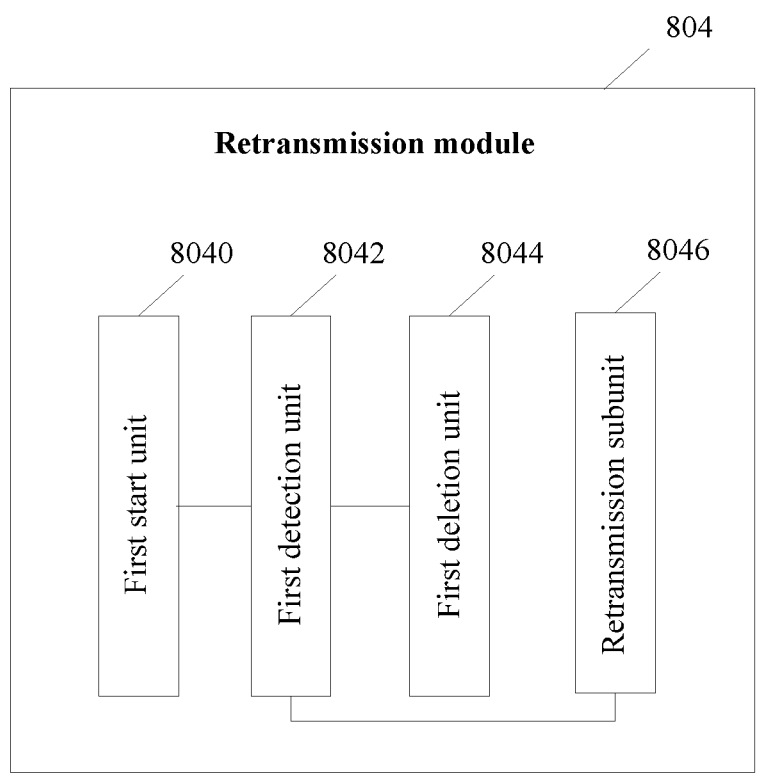
FIG. 9 is a schematic structural diagram of a retransmission module according to an embodiment of this application.

FIG. 9 is a schematic structural diagram of a retransmission module according to an embodiment of this application. The retransmission module 804 may include: a first start unit 8040, a first detection unit 8042, a first deletion unit 8044, and a retransmission subunit 8046.

The first start unit 8040 is configured to start a first timer to perform timing for a current important voice frame in a retransmission sending window of the retransmission processing queue, in which a timing start time of the first timer is a sending time point of the current important voice frame in the target sending queue.

The first detection unit 8042 is configured to detect whether a status acknowledge frame returned by the data receiving party for the current important voice frame is received before timing of the first timer ends.

The first deletion unit 8044 is configured to: when a detection result is yes, delete the current important voice frame from the retransmission processing queue.

The retransmission subunit 8046 is configured to: when a detection result is no, retransmit the current important voice frame in the retransmission processing queue to the data receiving party.

Further, the retransmission module 804 may further include a second start unit and a second deletion unit. The second start unit is configured to: while the first start unit 8040 starts the first timer for timing, start a second timer for timing. The timing length of the second timer is greater than the timing length of the first timer. The second deletion unit is configured to: delete the current important voice frame from the retransmission processing queue when the status acknowledge frame returned by the data receiving party for the current important voice frame is received before timing of the second timer ends or when timing of the second timer ends.

Alternatively, the retransmission module 804 may further include a third start unit and a third deletion unit. The third start unit is configured to: after the retransmission subunit 8046 retransmits the important voice frame in the retransmission processing queue to the data receiving party, start a second timer for timing. The third deletion unit is configured to delete the current important voice frame from the retransmission processing queue when the status acknowledge frame returned by the data receiving party for the current important voice frame is received before timing of the second timer ends or when timing of the second timer ends.

The retransmission module 804 may include all of the second start unit, the second deletion unit, the third start unit, and the third deletion unit.

Figure 10:
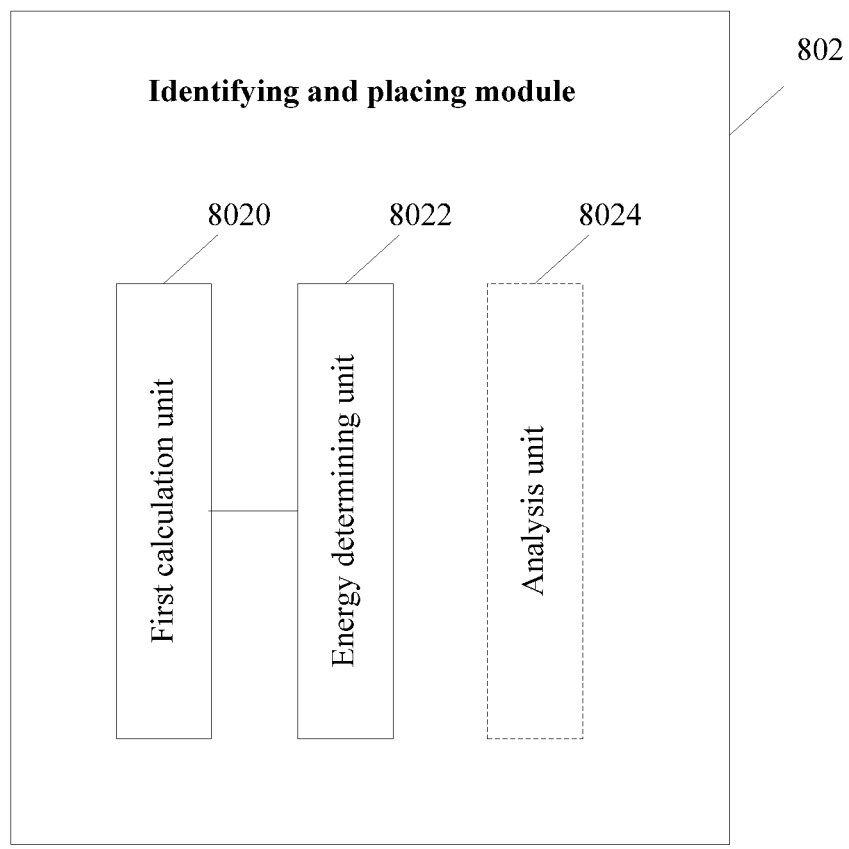
FIG. 10 is a schematic structural diagram of an identifying and placing module according to an embodiment of this application.

FIG. 10 is a schematic structural diagram of an identifying and placing module according to an embodiment of this application. The identifying and placing module 802 may include: a first calculation unit 8020 and an energy determining unit 8022.

The first calculation unit 8020 is configured to calculate frame energy of the voice data frame.

The energy determining unit 8022 is configured to: determine whether the frame energy is less than a first preset threshold; and when a determining result is yes, identify the voice data frame as an unimportant voice frame.

Further, the identifying and placing module 802 may further include an analysis unit 8024, configured to: analyze the voice data frame to determine whether the voice data frame does not include voice content information; and when an analysis result is yes, identify the voice data frame as an unimportant voice frame.

Figure 11:
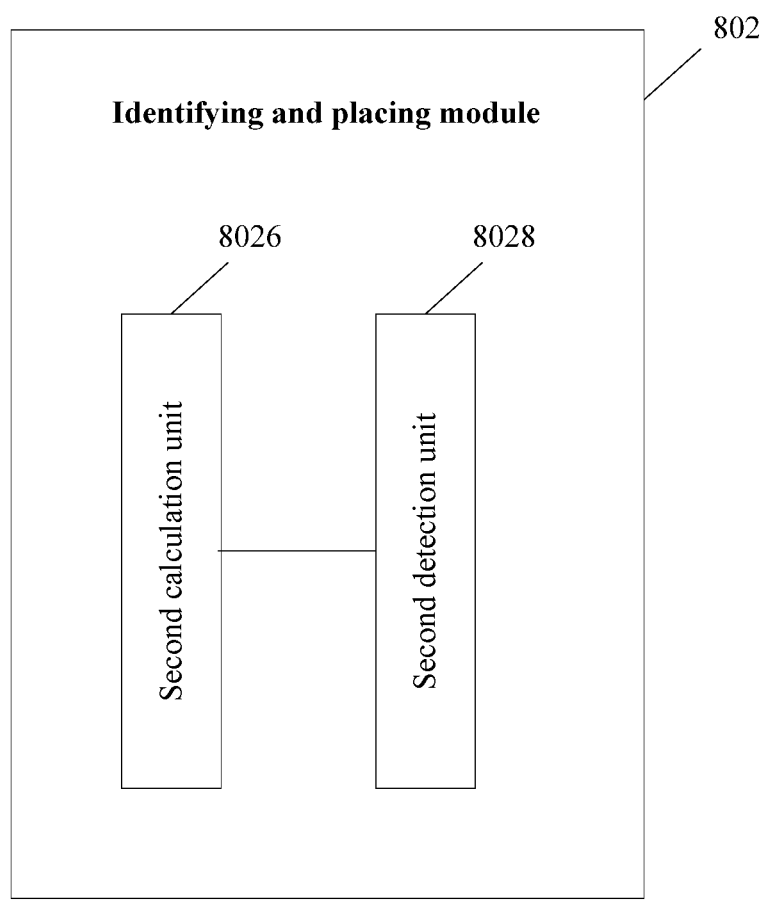
FIG. 11 is a schematic structural diagram of an identifying and placing module according to another embodiment of this application.

FIG. 11 is a schematic structural diagram of an identifying and placing module according to another embodiment of this application. The identifying and placing module 802 may include: a second calculation unit 8026 and a second detection unit 8028.

The second calculation unit 8026 is configured to calculate absolute values of first M LSP coefficient differences between the voice data frame and a previous voice data frame relative to the voice data frame.

The second detection unit 8028 is configured to: detect whether calculated M absolute values are all less than a second preset threshold; and when a detection result is yes, identify the voice data frame as an unimportant voice frame.

Figure 12:
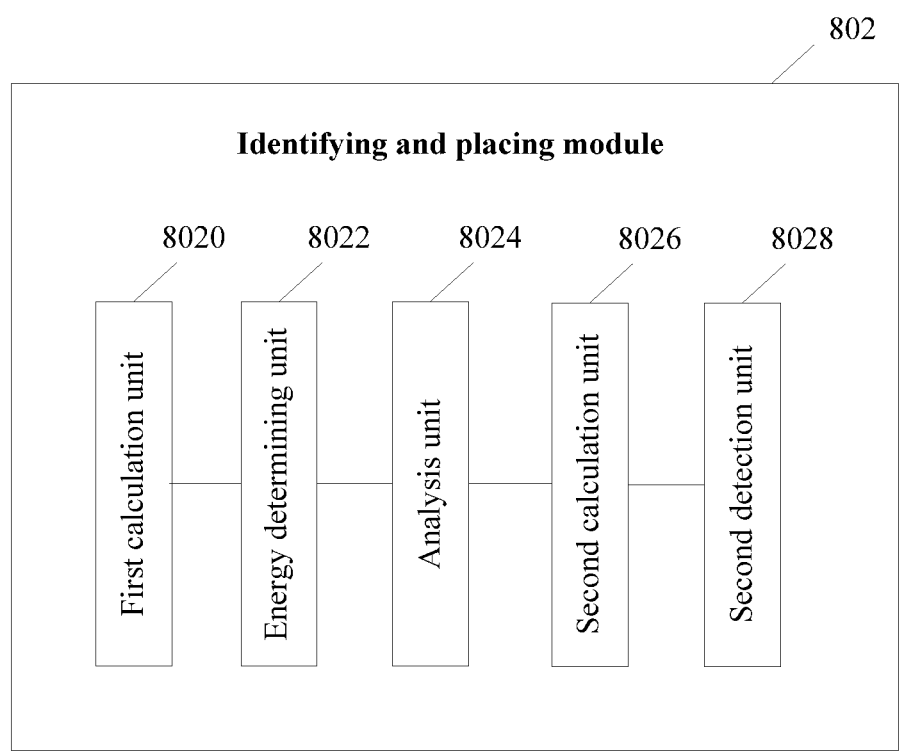
FIG. 12 is a schematic structural diagram of an identifying and placing module according to another embodiment of this application.

FIG. 12 is a schematic structural diagram of an identifying and placing module according to another embodiment of this application. The identifying and placing module 802 may further include: a second calculation unit 8026 and a second detection unit 8028 in addition to the first calculation unit 8020, the energy determining unit 8022, and the analysis module 8024.

When determining that the frame energy is not less than the first preset threshold, the energy determining unit 8024 triggers the analysis module 8024 to analyze the voice data frame to determine whether the voice data frame does not include voice content information, and when learning by analysis that the voice data frame includes the voice content information, the energy determining unit 8024 triggers the second calculation unit 8026 to calculate absolute values of first M LSP coefficient differences between the voice data frame and a previous voice data frame relative to the voice data frame.

The first calculation unit 8020, the energy determining unit 8022, the analysis module 8024, the second calculation unit 8026, and the second detection unit 8028 of the identifying and placing module 802 are combined in a manner not limited to the foregoing descriptions, and may further be randomly combined according to descriptions in the method embodiments.

Figure 13:
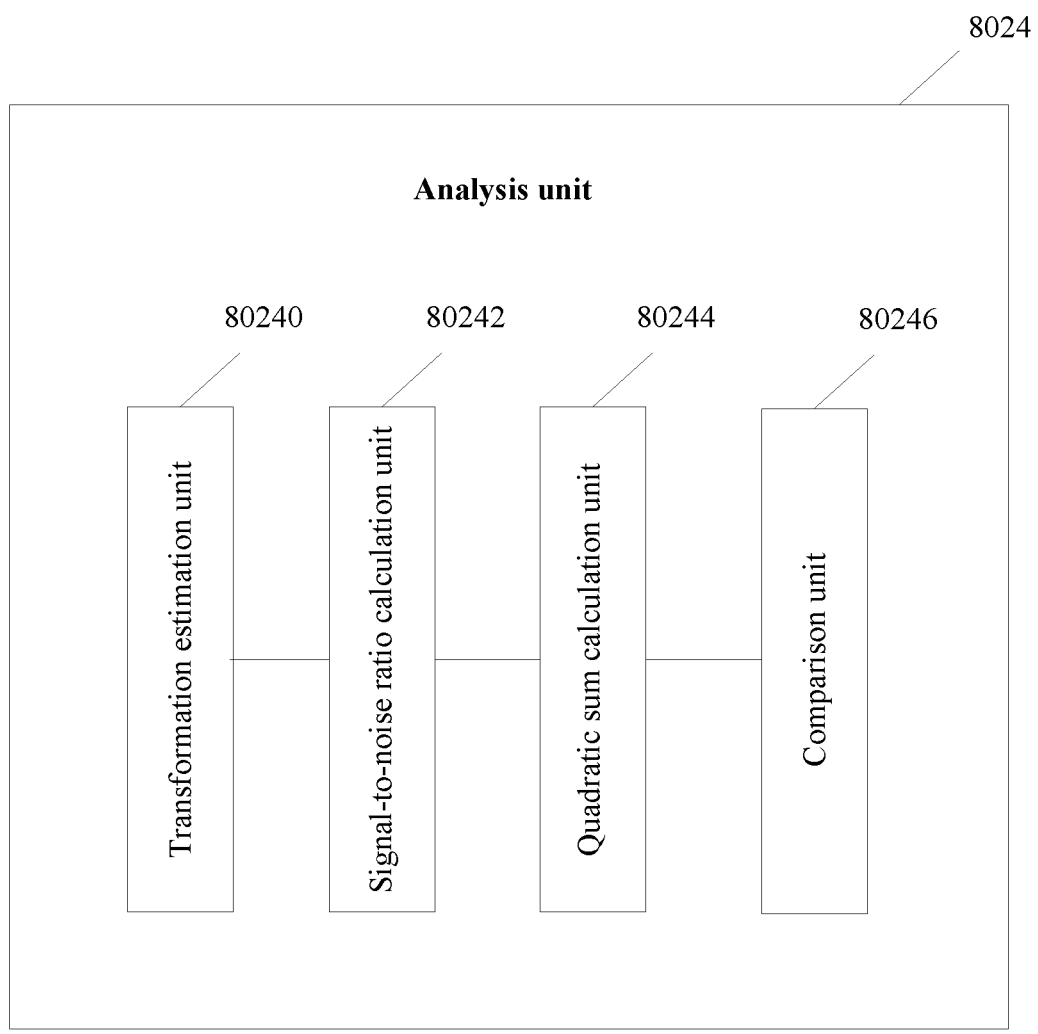
FIG. 13 is a schematic structural diagram of an analysis unit according to an embodiment of this application.

FIG. 13 is a schematic structural diagram of an analysis unit according to an embodiment of this application. As shown in FIG. 13, the analysis unit 8024 may include: a transformation estimation unit 80240, a signal-to-noise ratio calculation unit 80242, a quadratic sum calculation unit 80244, and a comparison unit 80246.

The transformation estimation unit 80240 is configured to: perform FFT of 2N points on the voice data frame, to obtain a power spectrum of the voice data frame; and estimate noise energy of each frequency, where N is a positive integer.

The signal-to-noise ratio calculation unit 80242 is configured to calculate a signal-to-noise ratio of each frequency according to the power spectrum and the noise energy.

The quadratic sum calculation unit 80244 is configured to calculate a quadratic sum of the signal-to-noise ratios of the frequencies according to the signal-to-noise ratios of the frequencies.

The comparison unit 80246 is configured to: perform comparison to determine whether the quadratic sum of the signal-to-noise ratios of the frequencies is less than a third preset threshold; and when a comparison result is yes, identify the voice data frame as an unimportant voice frame.

In conclusion, in implementation of the embodiments, multiple voice data frames are placed in a target sending queue, and the multiple voice data frames are sequentially sent to a data receiving party. The multiple voice data frames in the target sending queue are identified, and an identified important voice frame is placed in a retransmission processing queue. For the multiple voice data frames, retransmission processing is performed on only the important voice frame in the retransmission processing queue. But retransmission processing is not performed on the unimportant voice frame. It is not required that a receiving status of each voice data frame is determined to determine whether retransmission is needed. This effectively resolves an existing-technology technical problem that when a network capability is relatively weak, data retransmission increases network bandwidth pressure and does not help data transmission. In the embodiment, a retransmission policy is executed by defining the unimportant voice frame and determining whether the sent voice data frame is the unimportant voice frame. A non-voice frame, a noise frame with extremely low energy, or a frame that can be desirably restored by using a packet loss compensation means is not retransmitted. A relatively large part of frame retransmission can be avoided in a call process, thereby more effectively using network bandwidth In addition, the methods, apparatuses, and modules and units thereof in the embodiments of this application may be integrated into one processing unit, or each of the modules and units may exist alone physically. Alternatively, two or more apparatuses or modules may be integrated into one unit. The integrated unit may be implemented in a form of hardware, or may be implemented in a form of a software functional unit.

In an embodiment, the voice data transmission apparatus may run in various computing devices that can perform user information processing based on Internet, and is loaded in memories of the computing devices.

Figure 14:
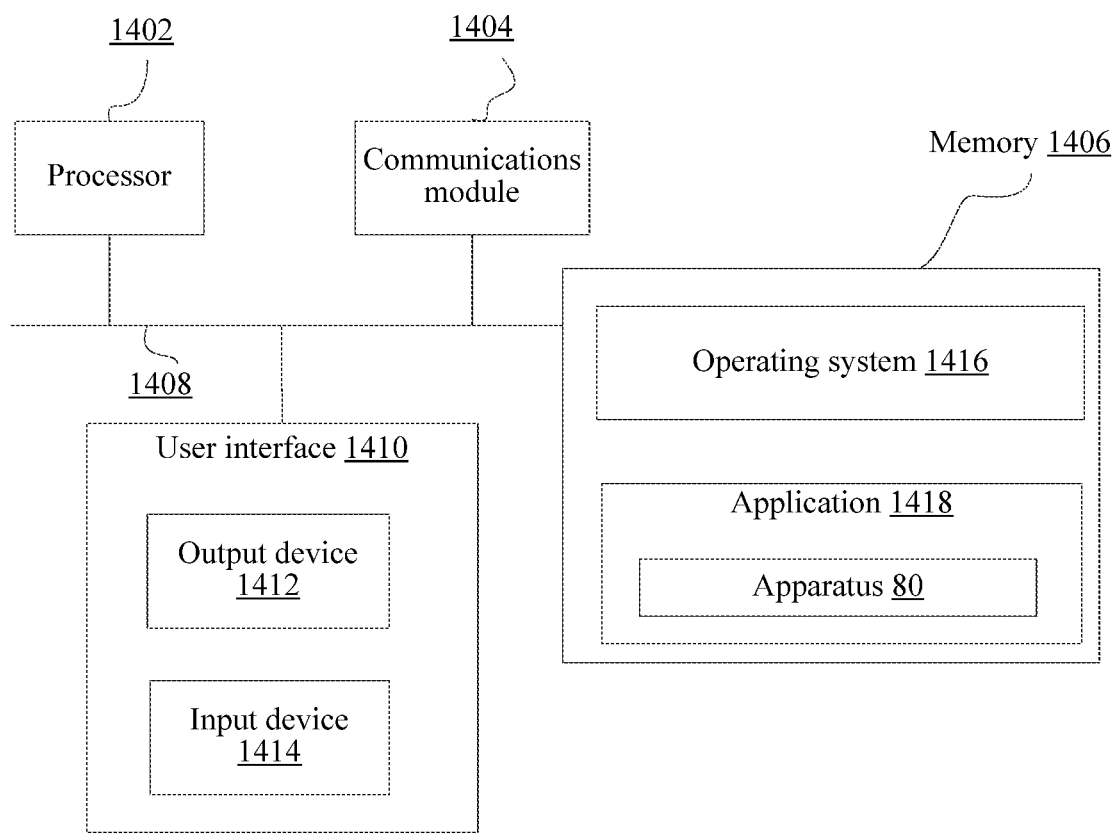
FIG. 14 is a structural diagram of a device according to an embodiment of this application.

FIG. 14 is a structural composition diagram of a computing device in which a voice data transmission apparatus is located. As shown in FIG. 14, the computing device includes at least one processor (CPU) 1402, a communications module 1404, a memory 1406, a user interface 1410, and a communications bus 1408 configured to interconnect these components.

The processor 1402 may receive and send data by using the communications module 1404, to implement network communication and/or local communication.

The user interface 1410 includes at least one output device 1412, including one or more speakers and/or one or more visual displays. The user interface 1410 also includes at least one input device 1414, including, for example, a keyboard, a mouse, a sound command input unit or a loudspeaker, a touchscreen display, a touch-sensitive tablet, a posture capturing camera, and another input button or control.

The memory 1406 may be a high-speed random access memory such as a DRAM, a SRAM, or a DDR RAM, or another random access solid-state storage device, or a non-volatile memory such as one or more magnetic disk storage devices, an optical disc storage device, a flash memory device, or another non-volatile solid-state storage device.

The memory 1406 stores an executable instruction set of the processor 1402, including:

an operating system 1416, including a program used to process various basic system services and perform hardware-related tasks; and an application 1418, including various programs used to implement voice data transmission, where the program can implement the processing procedures of the foregoing embodiments, for example, may include the voice data transmission apparatus 80 shown in FIG. 8.

In some embodiments, the voice data transmission 80 may include the module 802, the module 804, the module 806, the unit 8020, the unit 8022, the unit 8024, the unit 8026, the unit 8028, the unit 8040, the unit 8042, the unit 8044, and the unit 8046 shown in FIG. 8 to FIG. 13, and the modules may store a machine executable instruction. The processor 1402 can implement the functions of the modules and the units by executing the machine executable instruction in the modules and the units in the memory 1406.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), a random access memory (RAM), or the like.

Therefore, this application further discloses a non-volatile storage medium, which stores a data processing program. The data processing program is used for executing any embodiment of the foregoing method of this application.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

What is disclosed above are examples of this application, and is not intended to limit the claims of this application. Therefore, equivalent variations made in accordance with the claims of this application shall still fall within the scope of this application.

What is claimed is:

1. A voice data transmission method performed by at least one processor, the method comprising:
   placing multiple voice data frames in a target sending queue;
   sequentially sending the multiple voice data frames to a data receiving party;
   identifying one or more voice frames to be retransmitted, among the multiple voice data frames placed in the target sending queue;
   placing the one or more voice frames that are identified, in a retransmission processing queue; and
   for the multiple voice data frames that are sent, performing retransmission processing on only the one or more voice frames placed in the retransmission processing queue,
   wherein the identifying the one or more voices frames comprises:
      calculating a frame energy of one of the multiple voice data frames placed in the target sending queue;
      determining whether the frame energy is less than a first preset threshold; and
      based on the frame energy being determined to not be less than the first preset threshold;
         performing a fast Fourier transformation (FFT) of 2N points on the one of the multiple voice data frames, to obtain a power spectrum of the one of the multiple voice data frames, wherein N is a positive integer;
         estimating noise energy of each frequency;
         calculating a signal-to-noise ratio of each frequency, based on the power spectrum and the noise energy;
         calculating a quadratic sum of the signal-to-noise ratio of each frequency;
         determining whether the quadratic sum of the signal-to-noise ratio of each frequency is less than a second preset threshold; and
         in response to the quadratic sum of the signal-to-noise ratio of each frequency being determined to be less than the second preset threshold, identifying the one of the multiple voice data frames as a voice frame that is not retransmitted.

2. The method according to claim 1, wherein the performing the retransmission processing comprises:
   starting a first timer to perform first timing for a current voice frame, among the one or more voice frames, in a retransmission sending window of the retransmission processing queue, wherein a timing start time of the first timer is a sending time point of the current voice frame that is placed in the target sending queue;
   detecting whether a status acknowledge frame that is returned by the data receiving party for the current voice frame is received before the first timing of the first timer ends;
   in response to the status acknowledge frame being detected to be received before the first timing of the first timer ends, deleting the current voice frame from the retransmission processing queue; and
   in response to the status acknowledge frame being detected to not be received before the first timing of the first timer ends, retransmitting the current voice frame that is placed in the retransmission processing queue, to the data receiving party.

3. The method according to claim 2, further comprising, while the first timer is started:
   starting a second timer to perform second timing for the current voice frame, wherein a second timing length of the second timer is greater than a first timing length of the first timer; and
   deleting the current voice frame from the retransmission processing queue, in response to the status acknowledge frame being detected to be received before the second timing of the second timer ends or when the second timing of the second timer ends.

4. The method according to claim 2, further comprising, after the current voice frame is retransmitted:
   starting a second timer to perform second timing for the current voice frame; and
   deleting the current voice frame from the retransmission processing queue, in response to the status acknowledge frame being detected to be received before the second timing of the second timer ends or when the second timing of the second timer ends.

5. The method according to claim 1, wherein the identifying the one or more voices frames comprises, in response to the frame energy being determined to be less than the first preset threshold, identifying the one of the multiple voice data frames as the voice frame that is not retransmitted.

6. The method according to claim 1, wherein the identifying the one or more voices frames comprises:
   analyzing one of the multiple voice data frames to determine whether a volume of voice content information included in the one of the multiple voice data frames is less than a threshold; and
   in response to the volume of the voice content information being determined to be less than the threshold, identifying the one of the multiple voice data frames as the voice frame that is not retransmitted.

7. The method according to claim 1, wherein the identifying the one or more voices frames comprises:
   calculating absolute values of first M linear spectrum pair (LSP) coefficient differences between one of the multiple voice data frames and a previous voice data frame relative to the one of the multiple voice data frames;
   detecting whether the absolute values are all less than a third preset threshold; and
   in response to the absolute values being detected to be all less than the third preset threshold, identifying the one of the multiple voice data frames as the voice frame that is not retransmitted.

8. The method according to claim 1, further comprising, based on the frame energy being determined to not be less than the first preset threshold:
   analyzing one of the multiple voice data frames to determine whether a volume of voice content information inch in the one of the multiple voice data frames is less than a threshold; and
   in response to the volume of the voice content information being determined to be less than the threshold, identifying the one of the multiple voice data frames as the voice frame that is not retransmitted.

9. The method according to claim 1, further comprising, based on the frame energy being determined to not be less than the first preset threshold:
   calculating absolute values of first M linear spectrum pair (LSP) coefficient differences between one of the multiple voice data frames and a previous voice data frame relative to the one of the multiple voice data frames;
   detecting whether the absolute values are all less than a third preset threshold; and in response to the absolute values being detected to be all less than the third preset threshold, identifying the one of the multiple voice data frames as the voice frame that is not retransmitted.

10. The method according to claim 6, further comprising, based on the one of the multiple voice data frames being determined to comprise the voice content information:
calculating absolute values of first M linear spectrum pair (LSP) coefficient differences between one of the multiple voice data frames and a previous voice data frame relative to the one of the multiple voice data frames;
detecting whether the absolute values are all less than a third preset threshold; and
in response to the absolute values being detected to be all less than the third preset threshold, identifying the one of the multiple voice data frames as the voice frame that is not retransmitted.

11. A voice data transmission apparatus, comprising:
at least one memory configured to store computer program code; and
at least one processor configured to access the at least one memory and operate according to the computer program code, the computer program code comprising:
placing and sending code configured to cause the at least one processor to place multiple voice data frames in a target sending queue, and sequentially send the multiple voice data frames to a data receiving party;
identifying and placing code configured to cause the at least one processor to identify one or more voice frames to be retransmitted, among the multiple voice data frames placed in the target sending queue, and place the one or more voice frames that are identified, in a retransmission processing queue; and
retransmission code configured to cause the at least one processor to, for the multiple voice data frames that are sent, perform retransmission processing on only the one or more voice frames placed in the retransmission processing queue;
calculation code configured to cause the at least one processor to calculate a frame energy of one of the multiple voice data frames placed in the target sending queue; and
energy determining code configured to cause the at least one processor to determine whether the frame energy is less than a first preset threshold,
wherein the identifying and placing code is further configured to cause the at least one processor to, based on the frame energy being determined to not be less than the first preset threshold:
perform a fast Fourier transformation (FFT) of 2N points on the one of the multiple voice data frames, to obtain a power spectrum of the one of the multiple voice data frames, wherein N is a positive integer;
estimate noise energy of each frequency;
calculate a signal-to-noise ratio of each frequency, based on the power spectrum and the noise energy;
calculate a quadratic sum of the signal-to-noise ratio of each frequency;
determine whether the quadratic sum of the signal-to-noise ratio of each frequency is less than a second preset threshold; and
in response to the quadratic sum of the signal-to-noise ratio of each frequency being determined to be less than the second preset threshold, identify the one of the multiple voice data frames as a voice frame that is not retransmitted.

12. The apparatus according to claim 11, wherein the computer program code further comprises:
start code configured to cause the at least one processor to start a first timer to perform first timing for a current voice frame, among the one or more voice frames, in a retransmission sending window of the retransmission processing queue, wherein a timing start time of the first timer is a sending time point of the current voice frame that is placed in the target sending queue;
detection code configured to cause the at least one processor to detect whether a status acknowledge frame that is returned by the data receiving party for the current voice frame is received before the first timing of the first timer ends;
deletion code configured to cause the at least one processor to, in response to the status acknowledge frame being detected to be received before the first timing of the first timer ends, delete the current voice frame from the retransmission processing queue; and
retransmission subunit code configured to cause the at least one processor to, in response to the status acknowledge frame being detected to not be received before the first timing of the first timer ends, retransmit the current voice frame that is placed in the retransmission processing queue, to the data receiving party.

13. The apparatus according to claim 11, wherein the identifying and placing code is further configured to cause the at least one processor to, in response to the frame energy being determined to be less than the first preset threshold, identify the one of the multiple voice data frames as the voice frame that is not retransmitted.

14. The apparatus according to claim 11, wherein the computer program code further comprises analysis code configured to cause the at least one processor to:
analyze one of the multiple voice data frames to determine whether a volume of voice content information included in the one of the multiple voice data frames is less than a threshold; and
in response to the volume of the voice content information being determined to be less than the threshold, identify the one of the multiple voice data frames as the voice frame that is not retransmitted.

15. The apparatus according to claim 11, wherein the calculation code is further configured to cause the at least one processor to calculate absolute values of first M linear spectrum pair (LSP) coefficient differences between one of the multiple voice data frames and a previous voice data frame relative to one of the multiple voice data frames, and
the computer program code further comprises detection code configured to cause the at least one processor to:
detect whether the absolute values are all less than a third preset threshold; and
in response to the absolute values being detected to be all less than the third preset threshold, identify the one of the multiple voice data frames as the voice frame that is not retransmitted.

16. A non-transitory computer-readable storage medium storing instructions that cause a processor of a voice data transmission apparatus to:
place multiple voice data frames in a target sending queue;
sequentially send the multiple voice data frames to a data receiving party;
identify one or more voice frames among the multiple voice data frames placed in the target sending queue;
place the one or more voice frames that are identified, in a retransmission processing queue;

for the multiple voice data frames that are sent, perform retransmission processing on only the one or more voice frames placed in the retransmission processing queue,
calculate a frame energy of one of the multiple voice data frames placed in the target sending queue;
determine whether the frame energy is less than a first preset threshold; and
based on the frame energy being determined to not be less than the first preset threshold:
perform a fast Fourier transformation (FFT) of 2N points on the one of the multiple voice data frames, to obtain a power spectrum of the one of the multiple voice data frames, wherein N is a positive integer;
estimate noise energy of each frequency;
calculate a signal-to-noise ratio of each frequency, based on the power spectrum and the noise energy;
calculate a quadratic sum of the signal-to-noise ratio of each frequency;
determine whether the quadratic sum of the signal-to-noise ratio of each frequency is less than a second preset threshold; and
in response to the quadratic sum of the signal-to-noise ratio of each frequency being determined to be less than the second preset threshold, identify the one of the multiple voice data frames as a voice frame that is not retransmitted.

17. The non-transitory computer-readable storage medium according to claim 16, wherein the instructions further cause the processor to:
start a first timer to perform first timing for a current voice frame, among the one or more voice frames, in a retransmission sending window of the retransmission processing queue, wherein a timing start time of the first timer is a sending time point of the current voice frame that is placed in the target sending queue;
detect whether a status acknowledge frame that is returned by the data receiving party for the current voice frame is received before the first timing of the first timer ends;
in response to the status acknowledge frame being detected to be received before the first timing of the first timer ends, delete the current voice frame from the retransmission processing queue; and
in response to the status acknowledge frame being detected to not be received before the first timing of the first timer ends, retransmit the current voice frame that is placed in the retransmission processing queue, to the data receiving party.

18. The non-transitory computer-readable storage medium according to claim 16, wherein the instructions further cause the processor to, in response to the frame energy being determined to be less than the first preset threshold, identify the one of the multiple voice data frames as the voice frame that is not retransmitted.

19. The non-transitory computer-readable storage medium according to claim 16, wherein the instructions further cause the processor to:
analyze one of the multiple voice data frames to determine whether a volume of voice content information included in the one of the multiple voice data frames is less than a threshold; and
in response to the volume of the voice content information being determined to be less than the threshold, identify the one of the multiple voice data frames as the voice frame that is not retransmitted.

* * * * *